Jan. 23, 1968 N. LOWY 3,364,568
SHAVER HAVING SELECTIVELY OPERABLE HEATING AND COOLING MEANS
Filed Dec. 9, 1965 6 Sheets-Sheet 1
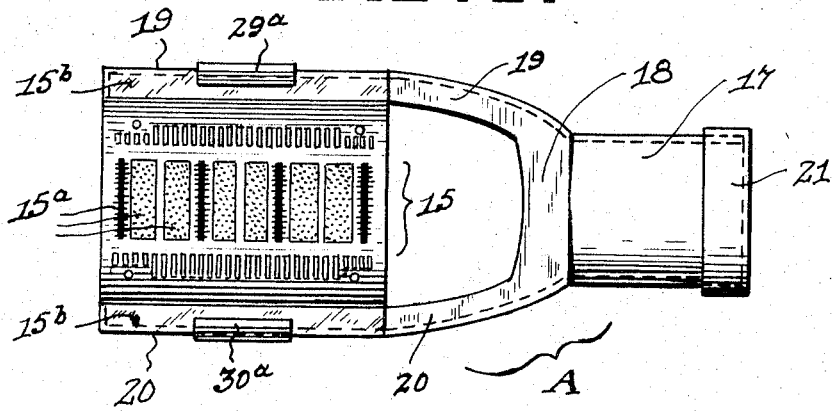
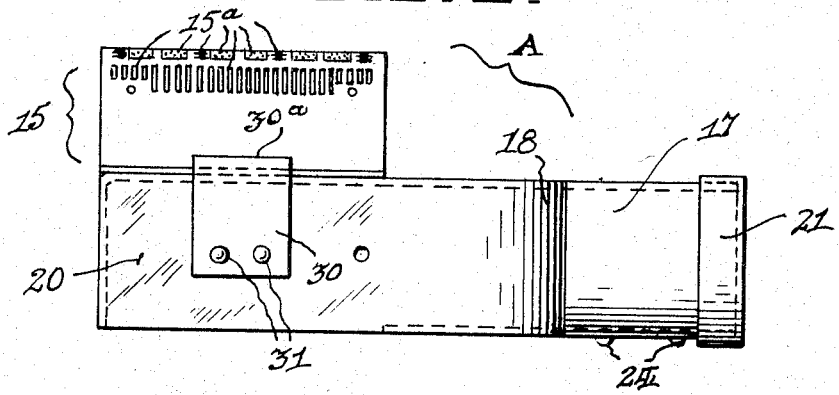
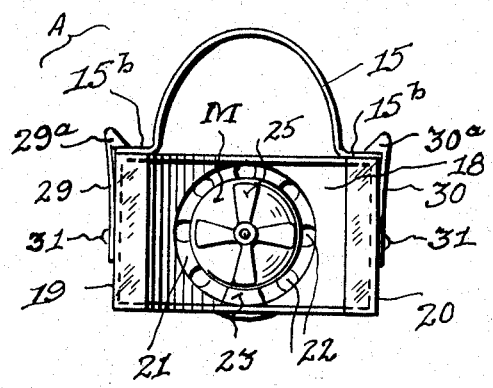
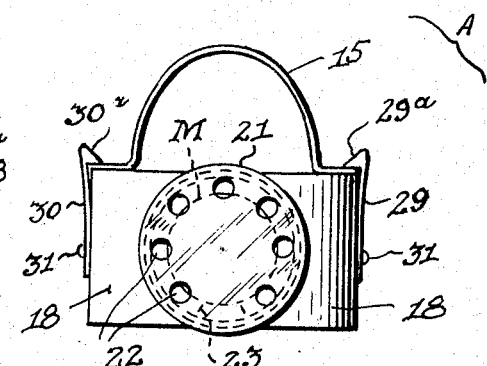
INVENTOR:
Nathaniel Lowy,
BY
A. E. Ischinger.
ATTORNEY.

Jan. 23, 1968 N. LOWY 3,364,568
SHAVER HAVING SELECTIVELY OPERABLE HEATING AND COOLING MEANS
Filed Dec. 9, 1965 6 Sheets-Sheet 2

INVENTOR:
Nathaniel Lowy,
BY
A. E. Tschinger
ATTORNEY.

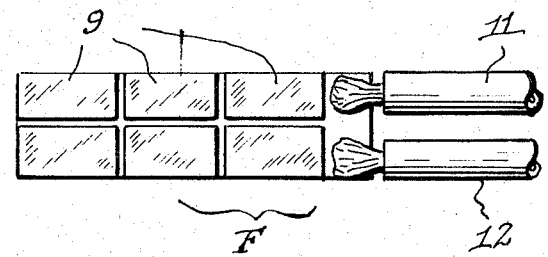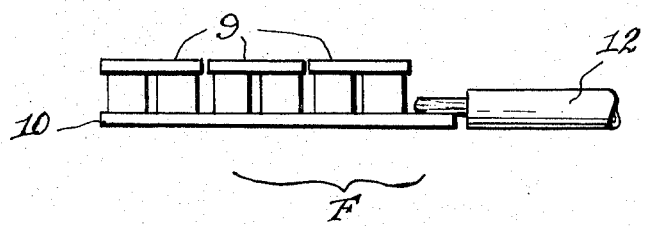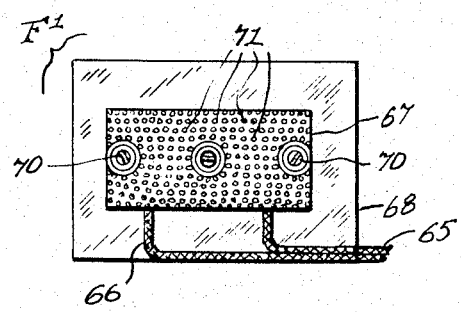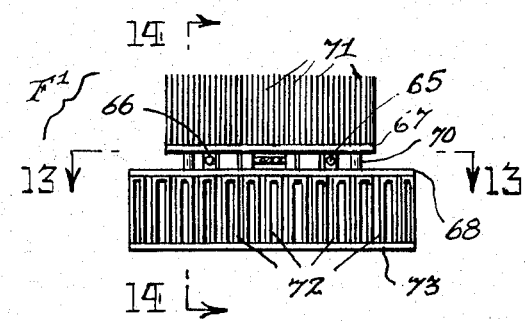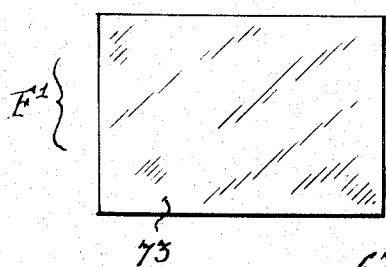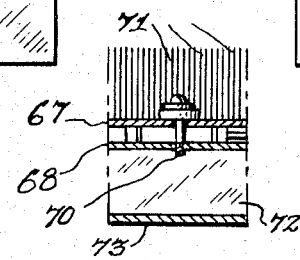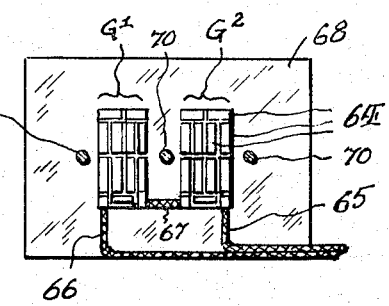

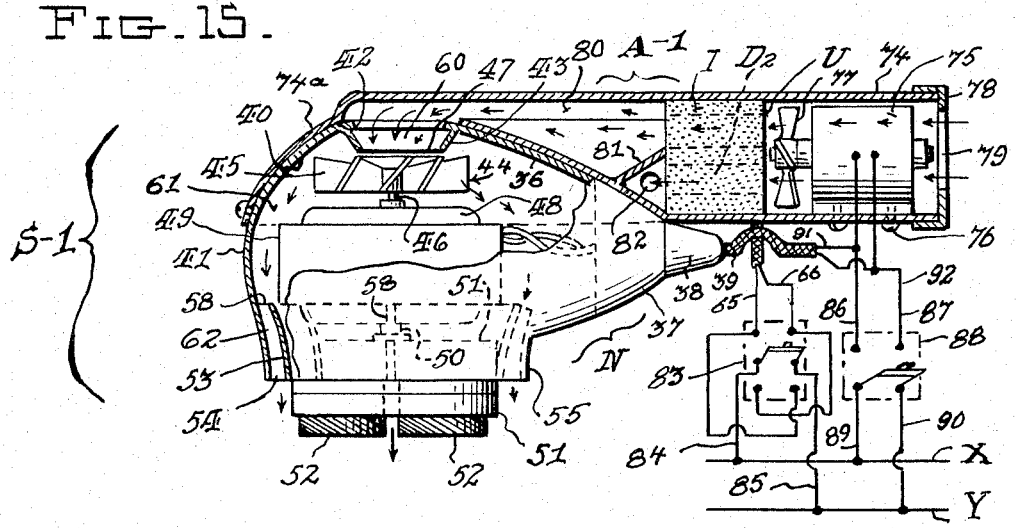
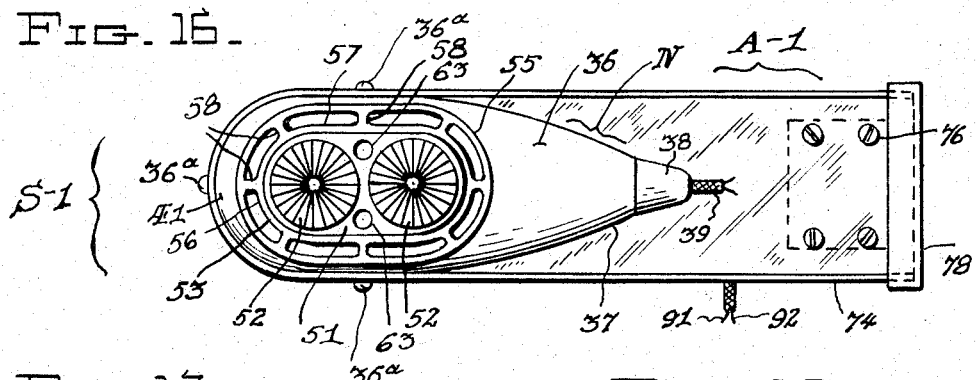
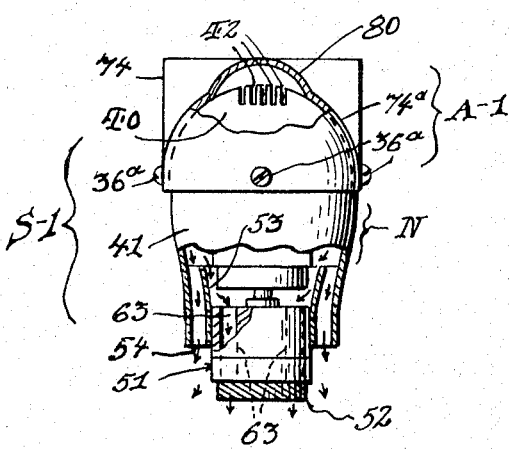
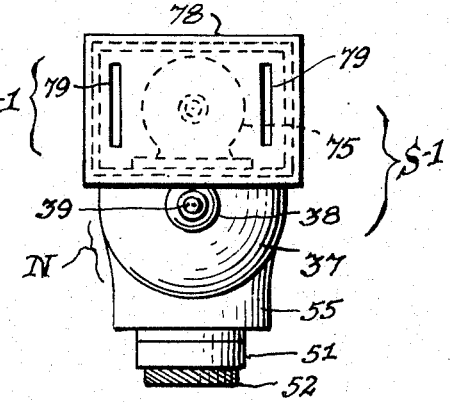

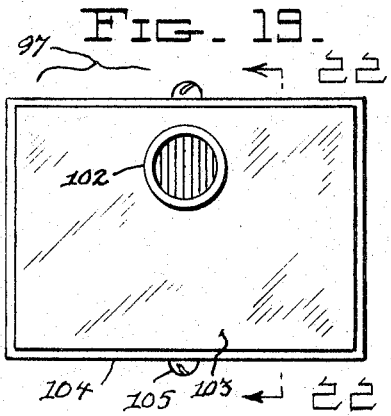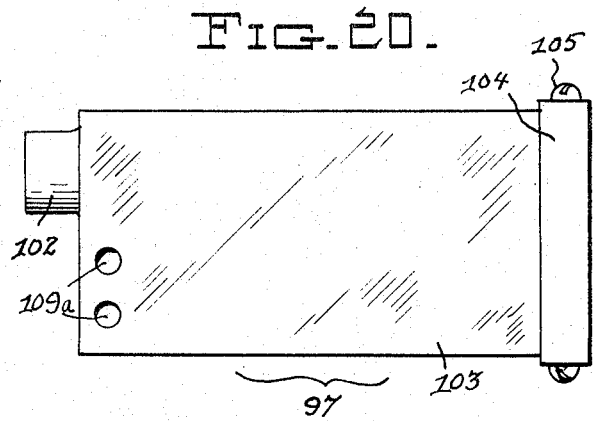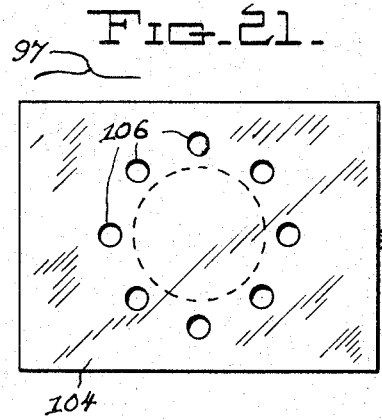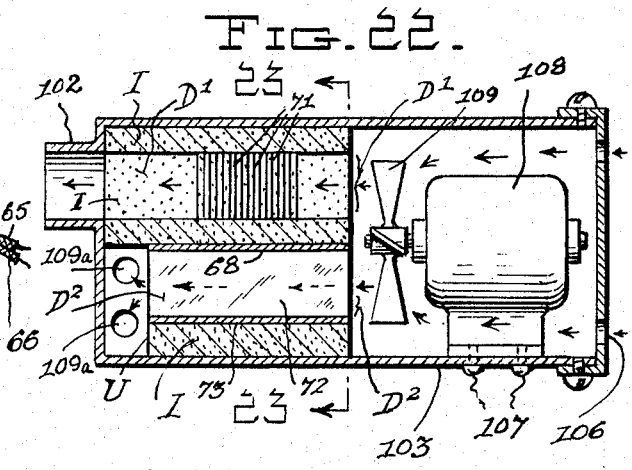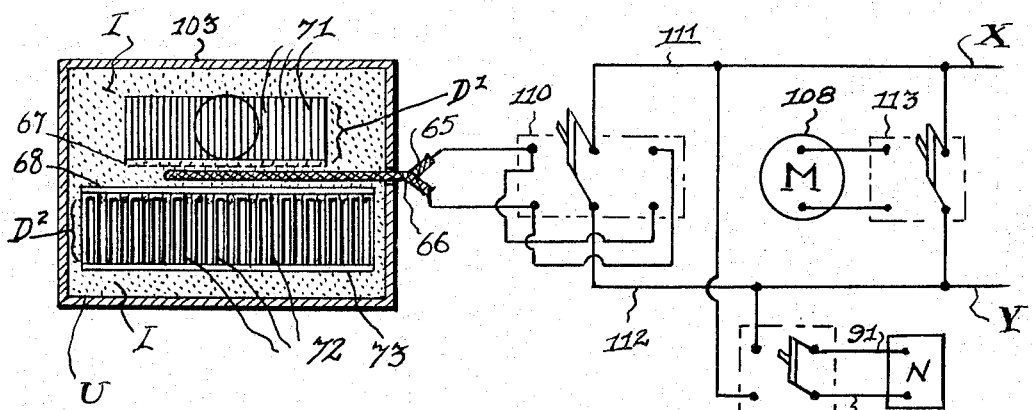

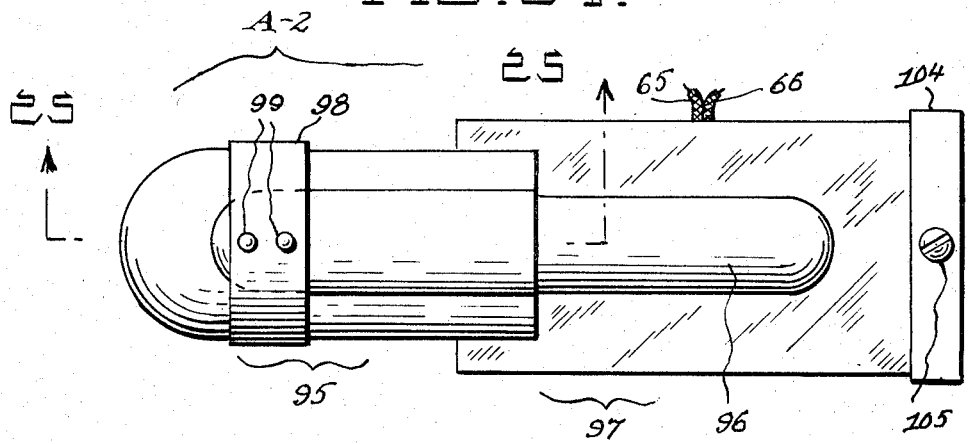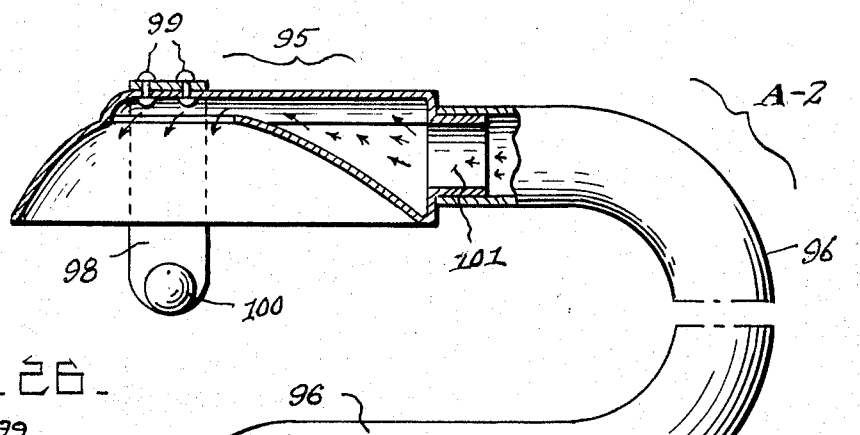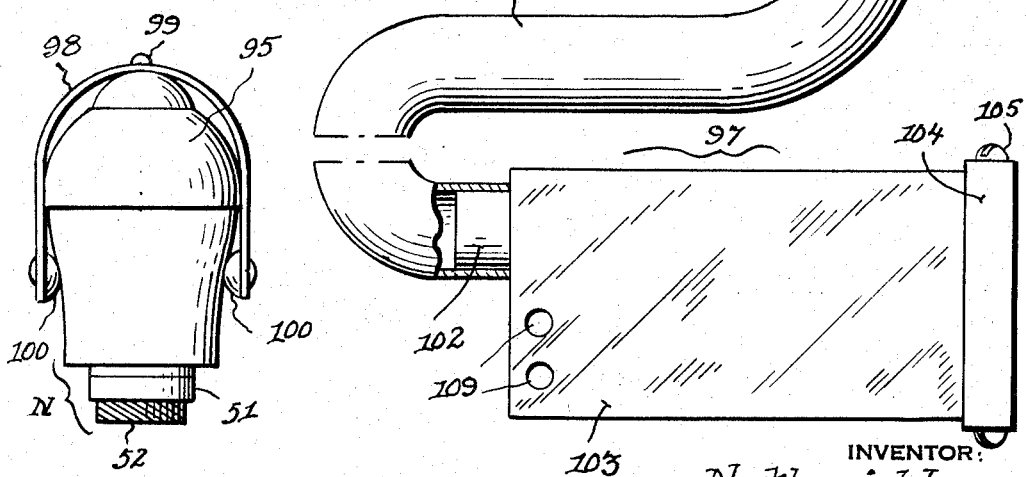

United States Patent Office
3,364,568
Patented Jan. 23, 1968

3,364,568
SHAVER HAVING SELECTIVELY OPERABLE
HEATING AND COOLING MEANS
Nathaniel Lowy, 429 17th St., Allentown, Pa. 18104
Filed Dec. 9, 1965, Ser. No. 512,756
8 Claims. (Cl. 30—34)

ABSTRACT OF THE DISCLOSURE

This invention concerns power operated shavers having selectively operable heating and cooling means.

This invention relates to power operated or electric shavers, and more particularly concerns a unique shaver of this type which is adapted to be selectively operated by a user thereof in such manner as to effect either the heating or the cooling of the surface area being shaved, as well as the shaver member in contact with said surface area, to thereby attain substantially maximum shaving comfort under the temperature conditions prevailing at the location where the shaver is being used.

One object of my invention is to provide a novel shaver of the type indicated.

Another object is to provide such a shaver which has certain structural and functional features of advantage over the similar shavers of the prior art.

A further object is to provide novel selectively operable heating and cooling means adapted to be cooperatively associated with power operated or electric shavers, which means, in one form, can be initially embodied in such a shaver so as to become an integral part or component thereof, and in another form, can be provided as a separate unit that is quickly and easily attachable to and removable from such a shaver.

Another object is to provide such selectively operable heating and cooling means that can be readily cooperatively associated with various types of modern standard or conventional power operated or electric shavers, such as a "Sunbeam" type shaver, a "Norelco" type shaver, etc.

An additional object is to provide such a shaver, and such selectively operable heatin gand cooling means, which comprises one or more small standard or conventional type "Frigistor" units, that by flow of an electric current therethrough in one direction, develop a temperature change in the opposed outer surface areas thereof to such an extent that one of said surface areas becomes cold and the other one hot, and vice versa, when the electric current flow through such units is reversed.

Another object is to provide such a shaver having a shaving head member adapted to be brought into contacting relation with the surface area acted on by the shaver, a selectively operable electrical unit arranged to effect either the heating or the cooling of both said member and said area, and means for selectively operating said unit.

With these and other objects in view, which will become readily apparent from the following detailed description of the illustrative and practical embodiments of my improvements shown in the accompanying drawings, my invention comprises a novel power operated or electric shaver, selectively operable heating and cooling means, elements, features of construction and arrangement of parts in cooperative relationship, as more particularly indicated and defined by the hereto appended claims.

In the drawings:

FIGURE 1 is a top plan view of one form of selectively operable heating and cooling means for a power operated or electric shaver, in accordance with my invention.

FIG. 2 is a side elevational view of FIG. 1.
FIG. 3 is a front end elevational view of FIG. 2.
FIG. 4 is a rear end elevational view of FIG. 2.
FIG. 5 is a top plan view of a standard "Sunbeam" type electric shaver having the selectively operable heating and cooling means of FIGS. 1-4 cooperatively combined therewith, certain upper parts of said means being broken away and shown in section so as to reveal various details of construction of said means.

FIG. 8 is a top plan view, on an enlarged scale, of a standard type of "Frigistor" unit embodied in the form of my invention illustrated by FIGS. 1-7.

FIG. 9 is a side elevational view of FIG. 8.

FIG. 10 is a top plan view of another standard type of "Frigistor" unit that forms part of the other embodiments of my invention disclosed by FIGS. 15 to 26 inclusive.

Figure 5:
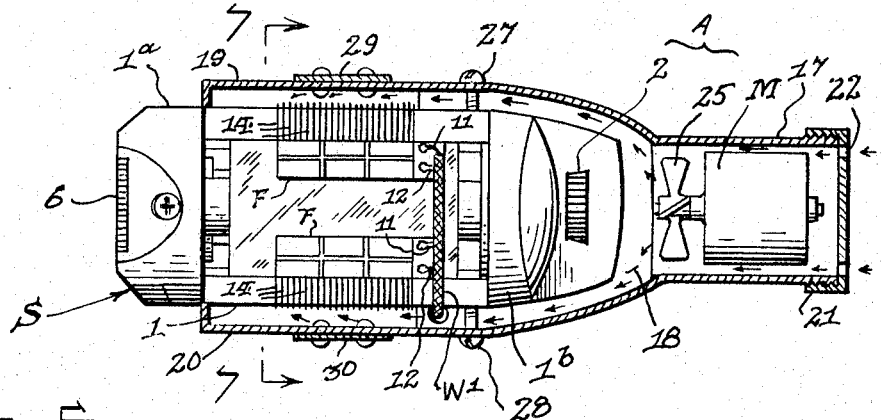

FIG. 11 is a side elevational view of FIG. 10.
FIG. 12 is a bottom plan view of FIG. 10.
FIG. 13 is a horizontal sectional view, taken substantially as indicated by the arorws 13—13 on FIG. 11.
FIG. 14 is an elevational sectional view, taken substantially as indicated by the arrows 14—14 on FIG. 11.

FIG. 15 is a side elevational view of a "Norelco" type electric shaver having another form of selectively operable heating and cooling means in accordance with my invention cooperatively combined therewith, certain parts being broken away to disclose structural details, and with a wiring diagram included to show the form of electric circuitry utilized in effecting operation of the shaver and the heating and cooling means.

FIG. 16 is a bottom plan view of FIG. 15, with the wiring diagram omitted.

FIG. 17 is a front elevational view of FIG. 15, certain parts being broken away so as to disclose structural details.

FIG. 18 is a rear elevational view of FIG. 15.
FIG. 19 is a front elevational view of a selectively operable heating and cooling unit in accordance with my invention, which unit forms one part or component of an attachment provided for separable connection with a standard type of power operated or electric shaver.

FIG. 20 is a side elevational view of FIG. 19.
FIG. 21 is a rear elevational view of FIG. 19.
FIG. 22 is an elevational sectional view, taken substantially as indicated by the arrows 22—22 on FIG. 19.
FIG. 23 is an elevational sectional view, taken substantially as indicated by the arrows 23—23 on FIG. 22, with a wiring diagram added to disclose the form of electric circuitry utilized in effecting selective operation of the unit.

FIG. 24 is a top plan view of a complete selectively operable heating and cooling unit in accordance with my invention, which forms a separably connectable attachment for a power operated or electric shaver.

FIG. 25 is a side elevational view of FIG. 24 with certain parts broken away to disclose structural details, and FIG. 26 is a front elevational view of the "Norelco" type electric shaver illustrated in FIGS. 15-18, and shows a certain part of the attachment of FIGS. 24 and 25, separably connected with said shaver.

Relative to the preceding brief descriptions of the figures of the drawings, it is to be noted that one embodiment of my invention is illustrated by FIGS. 1–9 inclusive, and that the remaining figures of the drawings disclose various modified forms thereof.

It will facilitate an understanding of my invention to first briefly consider some of the more important aspects and phases thereof, so that these may be kept in mind when subsequently reading the detailed description of the practical and illustrative embodiments of my novel improvements shown in the accompanying drawings.

Accordingly, it is noted that the power operated or electric shaver of my invention is adapted to be selectively operated by a user thereof in such manner as to effect either the heating or the cooling of the surface area being shaved, as well as the shaver member in contact with said surface area, to thereby attain substantially maximum shaving comfort under the temperature condition prevailing at the location where the shaver is being used.

To indicate the versatility of my shaver improvements, the latter are herein illustrated as cooperatively combined with two different forms of modern standards or conventional type electric shavers, as well as provided in the form of a separate attachment for electric shavers.

Embodiment No. 1

Referring now to the practical and exemplary form of my power operated or electric shaver improvements illustrated by FIGS. 1 to 9 inclusive of the drawings, it is pointed out that my said improvements are there shown embodied in a well known type of prior art electric shaver, namely, a "Sunbeam Shavemaster" Model 555 II shaver. This type of shaver is presently made available on the open market by the Sunbeam Corporation of Chicago, Illinois.

Figure 6:
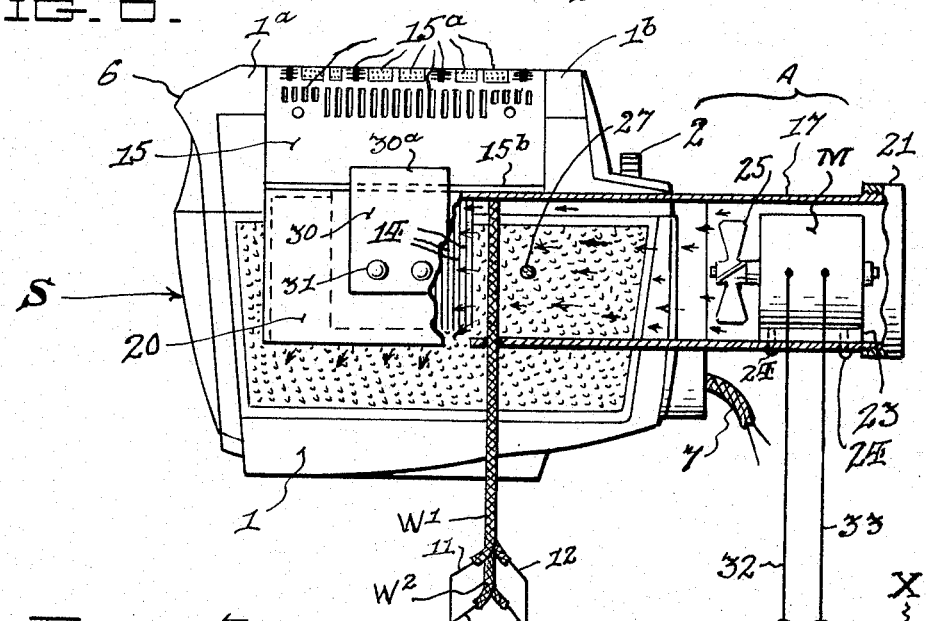
FIG. 6 is a side elevational view of FIG. 5, with certain parts broken away and with a wiring diagram included to disclose the form of electric circuitry utilized in effecting operation of the shaver and the selectively operable heating and cooling means.
Figure 7:
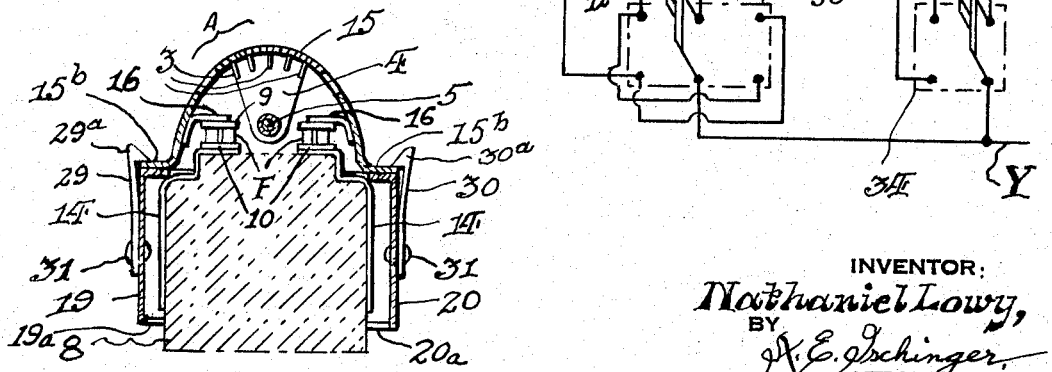
FIG. 7 is an elevational sectional view, taken substantially as indicated by the arrows 7—7 on FIG. 5, with certain parts of the shaver unit indicated more or less schematically or diagrammatically.

Only those parts of such a shaver are shown, or indicated, in FIGS. 5, 6 and 7 as will make it clear how the various elements of my improvements are cooperatively combined therewith to attain the novel results and advantages of my invention. For further and more detailed information concerning the construction and operation of said Sunbeam electric shaver, reference may be had to such an actual shaver, to the instruction booklet and other literature made available relative thereto by the manufacturer thereof and its sales organizations, and to the U.S. patents which have been granted thereon.

The said Sunbeam electric shaver is generally identified in FIGS. 5, 6 and 7 by the letter S, is operative as usual, and comprises such usual parts as a casing or housing 1, an on-off switch 2, a plurality of locked in blades 3, blade mountings, one of which is indicated at 4, a blade mounting vibrating or reciprocating shaft 5, a trimmer 6, and an electric cord 7 for connecting the shaver with a source of electric current supply.

In the cross-sectional view of FIG. 7, only the general outline of an intermediate upper plastic material body housing part 8 of said Sunbeam shaver is indicated and the dot-and-dash cross hatching within said outline is intended to designate, or represent, the usual well known shaver parts that are normally arranged and operative within said plastic material body housing part, but which shaver parts have been omitted for purposes of simplification of the illustration.

It will be understood that the said Sunbeam shaver, and the usual parts thereof heretofore identified, form no part of my invention, except insofar as they have my improvements cooperatively associated therewith to form a new shaver entity that comprises the inventive subject matter defined by the hereto appended claims.

Some of the parts and elements of my improvements are illustrated by FIGS. 1 to 4 inclusive as constituting an attachment that is generally identified by the letter A. This attachment is applied to the said Sunbeam shaver in the manner disclosed by FIGS. 5, 6 and 7.

Besides the said attachment, my said shaver improvements also include two similar electrical "Frigistor" units of the type well known and extensively used more particularly in the thermoelectric cooling apparatus field, or trade. Such a Frigistor unit is more or less schematically, or diagrammatically, illustrated on an enlarged scale in FIGS. 8 and 9 and is generally identified by the letter F. As indicated, the said Frigistor unit comprises a plurality of similar, separate, relatively spaced elements 9, that are fixedly secured to a base member 10 having soldered or otherwise secured thereto, two insulated conductors, or wires, 11 and 12. When an electric current is caused to flow through the conductors 11 and 12, to the base member 10, in one direction, the top surface areas of elements 9 will become cold and the bottom surface of the base member 10 will become hot. By reversing the electric current flow through the conductors 11 and 12, the temperature condition at the said top and bottom surfaces will also be reversed, i.e., the top surface areas of the elements 9 will then become hot and the bottom surface of the base member 10 will become cold. By connecting the conductors 11 and 12 with a source of electric current, through an interposed electric current flow reversing switch, the temperature condition at the upper surface areas of the elements 9 can consequently be selectively controlled and rendered either hot or cold, as desired, by selective operation of the current flow reversing switch, and this is the manner in which the Frigistor unit F is utilized as a selectively operable heating and cooling means in accordance with my invention, as hereinafter more particularly explained.

For a full and clear disclosure of the construction, operation and characteristics of the said and other similar Frigistor units, reference may be had to a publication, or booklet, entitled "Thermoelectric Cooling" by James Keane, issued by Needco Frigistors Ltd. of 5770 Andover Avenue, Montreal 9, Canada.

In this connection it is noted that the said Frigistor units are made available in various sizes and shapes, and that they are adapted and obtainable for operation by an electric house current, as well as by an electric battery, or cell current.

By referring to FIGS. 5 and 7, it will be seen that two of the Frigistor units F are fixedly located adjacent to the top surface of the plastic material body housing part 8, in such manner as to extend lengthwise in spaced relation along both sides of the reciprocatively operated shaving blades 3.

To increase the effectiveness, or efficiency, of the top surface temperature condition of the elements 9 of the unit F, when either hot or cold, a group, or a multiplicity, of metallic baffle wires or elements 14, have their upper ends contactingly interposed between the base members 10 of the units F, see FIGS. 7 and 9, and the top surface of the plastic material body housing part 8. The baffle elements 14 are arranged in closely spaced parallelism with each other and extend downwardly from the units F, respectively along the opposed outer surface contours of the plastic material housing part 8, as clearly indicated in FIG. 7. The units F and baffle elements 14 are fixedly connected with each other and with the top surface of the housing part 8, in any suitable and practical manner, as by means of an adhesive material, or other means used in the practice of securing such units and elements in place. It is also to be understood that insulating means, in the form of a coating material, etc., is applied to the units F and the elements 14 wherever needed in accordance with the well known practice followed in the field of use of such units and elements. The baffle elements 14 are arranged to be acted on by an air current, generated by and directed thereagainst by the attachment unit A of my invention, as hereinafter described, which air current functions to rapidly dissipate the temperature conditions prevailing along the bottom surfaces of the members 10, as determined by the selective operation of the units F.

As shown in FIGS. 5 and 6, the conductors 11 and 12 of the two Frigistor units F, F are formed into insulated double wire lines $W^1$ and $W^2$ that are arranged to extend transversely in superimposed relation across the top surface of the upper plastic material body part 8 of the shaver housing 1, then downwardly along one side of the latter and out through a suitable circular positioning aperture formed in the lower horizontal wall section of a bifurcated portion of the attachment A, to a place of connection, in parallel, with the proper electric current supply, as hereinafter more fully explained.

Extending across the top of the shaver blades 3, in directly adjacent slightly spaced relation therewith, is a usual metallic shaver comb 15, having an arrangement of comb apertures 15a like those of the said Sunbeam shaver comb. The comb 15, like the usual Sunbeam shaver comb, is of such size and shape that it can be detachably mounted in flush interfitting manner between two opposed relatively spaced vertically extending members 1a and 1b of the shaver casing 1, as clearly indicated in FIG. 6. However, instead of the usual hinge means being provided that makes it possible for the usual Sunbeam shaver comb to be swung out of its active position, when it is desired to clean the blades 3, etc., the shaver comb 15 is provided at each lower extremity thereof with an outwardly extending foot-like member 15b, that is adapted to enable detachable mounting of the comb 15 in the manner later explained.

Two angular contact plates or members, 16, 16, are secured by soldering, or otherwise, to the inner surface of the comb 15, as indicated in FIG. 7, which members 16 are adapted to contactingly rest on the top surfaces of the elements 9 of the Frigistor units F, when the comb 15 is in its operative position, thereby to conduct, or transmit, the hot or cold temperature condition prevailing at said surfaces directly to the comb 15.

The attachment A, as shown in FIGS. 1-4, is applied to the Sunbeam shaver S, as illustrated by FIGS. 5-7. This attachment generally comprises a casing, or housing, that is integrally formed of a suitable plastic material and includes a rear cylindrical portion 17, a central or intermediate section 18, and two bifurcated channel-like forward portions 19 and 20.

The rear end of the cylindrical portion 17 has a closure member, or cap 21, threadedly or otherwise detachably secured thereto, which closure member is provided with a plurality of air inlet apertures 22. Fixedly mounted within the cylindrical portion 17, is a small electric motor M, having a base member 23 that is secured to the bottom inner surface of the portion 17 by screws 24. A fan 25 is fixedly secured to the forward end of the motor shaft in any practical manner.

The forward ends of the bifurcated attachment portions 19 and 20 are arranged to extend transversely into edgewise contacting relation with the outer surface of the shaver casing 1 so as to close the air directing channel-like arrangement of the said portions 19 and 20 at this point. The upper and lower horizontally extending sections of the bifurcated portions 19 and 20, also extend into edgewise contacting relation with the outer surface of the shaver casing 1. However, the lower horizontally extending sections of the bifurcated portions 20 and 21 terminate somewhat rearwardly of the groups of baffle wires or elements 14, so as to thereby provide air outlet openings at this location of the bifurcated attachment or channel portions 19 and 20.

The upper and lower free edges of the horizontally extending central attachment section 18 are shaped and arranged to contactingly rest against the adjacent outer surface portions of the shaver housing 1.

The attachment A is fixedly secured to the shaver S by two screws 27 and 28, that respectively extend through apertures of slightly greater diameter than the screw shanks, which apertures are formed in the opposed vertical wall members of the bifurcated portions 19 and 20. The forward ends of the screws 27 and 28 are anchored in correspondingly threaded apertures formed in the plastic shaver housing 1, as indicated in FIG. 5.

When the attachment A is combined with the Sunbeam shaver, as indicated, it forms an air current generating and directing means, which takes in the air at the inlet apertures 22 and expels it at the air outlet openings 19a and 20a located below the lower ends of the baffle wires, or elements 14.

The previously referred to shaver comb 15 has its foot-like members 15b, 15b contactingly seated on the upper horizontal portions of the bifurcated channel-like members 19 and 20 of the attachment A. Two flexible spring metal plates 29 and 30 are respectively fixedly secured by rivets 31 to the outside of the vertically extending walls of the channel-like members 19 and 20. The upper ends of said flexible plates 29 and 30 are each provided with a detent member or formation 29a and 30a, adapted to detachably hold the shaver comb 15 in place on the attachment A, as clearly indicated in FIG. 3. When it is desired to remove the comb 15 from the shaver S, for cleaning or some other purpose, it is merely necessary to engage the said detent members 29a and 30a with a fingertip and slightly flex the members 29 and 30 outwardly away from the comb 15, so as to effect disengagement of the detents 29a and 30a from the foot-like members 15b, 15b of the comb 15.

The wiring diagram of FIG. 6 shows the manner in which the various electrical parts of my improvements are connected with a suitable source of electric current supply, generally indicated by the main power supply lines X and and Y, which, let it be assumed, represent the two terminals of an electric battery. The motor M is connected by conductors 32 and 33 with the power lines X and Y through an interposed double pole switch 34. The insulated double wire lines W¹ and W² of the Frigistor units F, F are connected to the power supply lines X and Y through an interposed current flow reversing switch 35. If the shaver S is of the battery operated type, the two wires of the cable 7 are also connected with the lines X and Y. When this circuitry has been established, the on-off switch 2 will control the operation of the shaver S in usual manner. The switch 34 will control the operation of the motor M, and the current flow reversing switch will enable selective control of the Frigistor units F, F, see FIGS. 5 and 7.

Of course, it is to be understood that the power supply lines X and Y may also be representative of the usual house current, or other suitable electric power supply lines, and that in such case, the respective circuits of the shaver S, motor M and Frigistors F can, if necessary, include one or more usual transformer units (not shown), to thereby establish the proper voltage and amperage required for best functioning of the shaver S, motor M and Frigistors F, all in accordance with the conventional practice or electrical engineering procedure normally applied in this field.

*Operation*

Depending upon the temperature prevailing at the location where the shaver S will be used, substantially maximum shaving comfort is attained by first selectively setting Frigistor control switch 35 of the shaver for either cool, or for warm shaving operation.

Let it be assumed that the user of the shaver S desired a cool shave. This can be readily accomplished by first closing the selectively operable electric current flow reversing switch 35, in proper manner, to cause the top surfaces of the elements 9 of the Frigistor units F, to become cold. By direct conduction through the contact plates 16, 16, this will cause the metal shaver comb 15 to become cool.

Since the operating action of the Frigistor units F is such that the bottom surfaces of the Frigistor base members 10 become hot as the top surfaces of the Frigistor elements 9 become cold, the efficiency of this action will be increased by rapidly dissipating the heat that prevails at the bottom surfaces of the Frigistor base members 10.

Such dissipation of the heat is accomplished by closing the switch 34 to effect operation of the motor M. This will cause the fan 25 to develop, or generate, an air current flow, as indicated by the small arrows in FIGS. 5 and 6. That is to say, operation of the fan 25 will draw air into the inlet apertures 22 of the cap 21, and cause it to flow forwardly through the conduit-like arrangement established by the attachment members 17, 18, 19 and 20 along the outer surface of the shaver S, to the air outlet point or location below the bottom ends of the baffle elements 14. In doing so, the said air current flow will sweep across, or turbulate about, the baffle elements 14, before it is ejected from the attachment A, and will consequently rapidly dissipate, or carry away, the heat from the baffle elements 14. This, in turn, will cause the upper surfaces of the elements to maintain their maximum cold temperature status.

When the shaver comb 15 has attained the cool temperature condition desired by the user of the shaver S, for the shaving operation, the shaver S is turned on by means of the shaver switch 2 and this will effect rapid vibration of the shaver blades 3 in fan-like manner. The cool air prevailing in the upper part of the shaver head, between the Frigistor units F and the shaver comb 15, will be forced outwardly through the shaver comb apertures 15a, by said fan-like action of the blades 3, and against the shaving area contacted by the shaver comb 15.

If the user of the shaver S desires that the skin surface area being shaved, and the shaver comb 15, be maintained in a comfortably warm, or heated, condition, during the shaving operation, it is merely necessary that the selectively operable electric current flow reversing switch 35 be first closed, in proper manner, to cause the top surfaces of the elements 9 of the Frigistor units F to become heated. Thereafter, the user of the shaver follows substantially the same procedure of closing the motor switch 34 and the shaver switch 2, as before, i.e. as previously described to effect a cool shave.

From the preceding description of my electric shaver improvements, it will be apparent that the shaver S of my invention can be selectively operated to effect either warming, or cooling, of both the surface, or skin area acted on by the shaver, and of the shaver comb, or member, which is in contact with said area.

Embodiments Nos. 2 and 3

The second practical and exemplary form of my power operated, or electric, shaver is illustrated by FIGS. 10 to 18 inclusive of the drawings. Of these illustrations, FIGS. 10 to 14 inclusive show another form of well known Frigistor unit, and FIGS. 15 to 18 inclusive disclose such a unit and other elements of my improvements cooperatively associated with a modified form of well known "Norelco" type of prior art electric shaver, such as disclosed by U.S. Patent No. 2,899,743, which was issued Aug. 18, 1959.

Some prior art Norelco type shavers are manufactured and sold by North American Philips Co., Inc., 100 E. 42nd St., New York, N.Y. and these differ from other prior art electric shavers mainly in that the Norelco type shaver has a shaving head that includes two circular cutting rotors, instead of cutting blades that are vibrated or reciprocated. The modified Norelco type shaver of Patent No. 2,899,743 includes the feature of an air flow inducing means, so formed as to produce maximum (unheated and uncooled) air flow from a relatively small, shaver head operating motor. The said air flow inducing means is designed to reduce the humidity of the skin and provide a cooling of the skin in the area in which, at the moment, the shaving action is occurring, thus to produce maximum comfort, less friction between the skin and the shaving head, and less irritation of the skin.

As hereinafter explained, my improvements can also be readily cooperatively combined with such a modified Norelco type electric shaver, so that the latter, like the previously described Sunbeam type shaver of my invention, can be selectively operated to effect either heating, or cooling, of both the surface or skin area acted on by the shaver, and of the shaving member (the Norelco type circular cutting rotors) that is brought into contact with said area during the shaving operation.

To make this readily apparent, it is noted that FIGS. 15, 16 and 17 correspond substantially with FIGS. 1, 2 and 3 of the drawings of said Patent No. 2,899,743, but have added thereto the improvements of my invention.

To facilitate an understanding of the construction and operation of the said patented Norelco type shaver, the latter will first be described in substantially the same manner as described by the specification of the patent, and this will be followed by a description of my inprovements as applied thereto.

The electric shaver of my invention illustrated by FIGS. 15 to 18 inclusive is generally designated by the reference character S-1 and comprises the said patented Norelco type shaver indicated generally by the letter N, and an attachment that is generally identified by the reference character A-1.

The said patented Norelco type shaver N is approximately of the same size as a conventional electric shaver that can be conveniently held in one hand and manipulated over the skin area to be shaved.

The shaver N includes a casing 36, and said casing has a tapering rear end portion 37 which, at its smaller end, has a usual prong-receiving socket, or receptacle (not shown), in which may be engaged an electric plug 38 from which extends a cord 39.

The tapering rear end portion 37 merges, at its forward larger end, into a main or head end portion 40, which is of dome-like formation as clearly shown in FIG. 15, with a rounded front end wall 41.

Formed in the top or crest portion of the head end portion 40 is a series of narrow, longitudinally extending air inlet slots 42 defining openings through which air may enter the housing in the direction of the arrows shown in FIG. 15. Integral or otherwise made rigid with the wall of the housing, and extending about the openings or slots 42, is a downwardly tapering shield 43. Shield 43 is continuous over the full periphery of the openings 42, and at its inner, narrower end, terminates immediately above the plane of a suction fan generally designated 44, having a series of blades 45 radiating from a shaft 46 that is extended perpendicularly to the plane of the inner end 47 (see FIG. 15) of the shield 43, and that is also perpendicular to the plane of rotation of the fan.

Shaft 46 extends from an electric motor 48, said motor including a body portion 49. The opposite end 50 of the shaft projects from the body or casing of the motor, into a shaving head generally designated 51. The shaving head is per se conventional, and in the particular type of shaver illustrated, said head includes circular cutting rotors 52, turning on axes parallel to each other and to the shaft 50.

Snugly receiving shaving head 51 is an oblong, endless deflector 53, which tapers in a direction toward a large outlet opening 54 of casing 36, said opening 54 being formed in a shaving head receiving lateral extension 55 of the casing.

The shaving head 51 projects a substantial distance outwardly through the opening 54, with the deflector 53 having rounded or semi-circularly curving end walls 56 and straight side walls 57.

Integrally connected between the deflector 53 and the wall of the extension 55 are uniformly spaced baffles 58. The baffles 58 are pitched obliquely to the axis of rotation of the shaft 50, so that air that is passing out of the housing through the annular space defined between the wall of extension 55 and the deflector 53 will be imparted a whirling movement, so as to strike the skin at an angle, rather than while traveling in a path directly broadside to the skin. This will produce maximum comfort, and will also cause the air to be directed against the skin over a large area.

In use of the shaver, on operation of the motor 48, the fan 44 will be operated in a direction to suck air into the suction compartment designated at 60 in FIG. 15 and defined in the space bounded by the shield 43. This will be an area in which a continuous suction or vacuum will be present during operation of the fan.

The air is drawn out of the compartment 60 through the space between the blades in the fan and is directed downwardly outwardly from the compartment 60, substantially as indicated by the outer arrows shown at the lower end of FIG. 15, thereby passing about the casing of the motor 48. The air, thus, flows in an annular column downwardly into the pressure compartment designated 61 in FIG. 15, said pressure compartment being the hollow interior of the housing, in which space the motor 48 is mounted.

Within the compartment 61, the air will be placed under pressure due to the fact that it is caused to pass out of the compartment only through a relatively restricted area designated at 62 (see FIG. 15) and constituting an annular flow passage defined between deflector 53 and the wall of the extension 55. The air in this passage is imparted the whirling movement or oblique travel previously described, thus to strike the skin obliquely to the surface of the skin and provide a desirable cooling action over the full area surrounding the shaving head.

The air outlet 54, in this connection, is disposed approximately one-half inch from the skin, so that there is a minimum dissipation of air prior to impingement against the skin. As a result, when the air hits the more or less humid or damp skin, evaporation of the moisture in the skin is speeded, lowering the moisture content of the skin. This causes the hairs to stand out to a greater extent, and at the same time, the skin is effectively cooled, in a manner designed to produce maximum comfort so far as the user of the device is concerned.

Accompanying the decrease in the moisture content of the skin is a considerable reduction in friction between the shaver and the skin. The reduction of said friction tends to increase to a marked degree the comfort with which a user operates the shaver, and at the same time, there is a corresponding reduction of irritation of the skin.

Having described the electric shaver of U.S. Patent No. 2,899,743 substantially in the manner of the specification thereof, it is to be noted that, in accordance with my invention, the shaver head 51 is provided with a plurality of vertically arranged apertures 63, which enable the air flow, indicated by the small arrows in FIG. 17, to pass therethrough. Since said air flow, when effected in accordance with my invention as hereinafter explained, may be either in a preheated or in a precooled condition, the arrangement of said apertures 63 will enable the air flow therethrough to intensify the air flow induced heating or cooling action on the shaver head 51, during its operation.

As previously indicated, the improvements of my invention are adapted to be cooperatively associated with the Norelco type shaver of Patent No. 2,899,743. This can be readily accomplished in two ways, one of which is to cooperatively combine therewith a permanent attachment, or unit A–1, as disclosed by FIGS. 15 to 18 inclusive. This constitutes the second embodiment of my invention. Another way in which this can be done is to cooperatively combine with the shaver of said patent a separate attachment or unit A–2, that can be readily separably connected with, and removed from, the shaver of said patent, as disclosed by FIGS. 19 to 26 inclusive. This constitutes the third embodiment of my invention.

The said permanent unit A–1 and said separable attachment A–2 are similar to a certain extent, so that it will facilitate an understanding of the second and third embodiments of my invention if the common features thereof are first indicated, or described. Accordingly, it is noted that units A–1 and A–2 are provided with a Frigistor unit that is generally identified by the reference character $F^1$ in FIGS. 10 to 14 inclusive. Since the Frigistor unit $F^1$, like the hereinbefore described Frigistor unit F, is also of a well known type, the component parts thereof are again more or less schematically, or diagrammatically illustrated, on an enlarged scale, in FIGS. 10 to 14 inclusive. For a full and clear disclosure of the construction, operation and characteristics of the Frigistor unit $F^1$, reference may also be had to the previously noted publication entitled "Thermoelectric Cooling."

The Frigistor unit $F^1$ generally comprises a plurality of similar, separate, relatively spaced elements 64, that are like the elements 9 of the Frigistor unit F of FIGS. 8 and 9. As shown in FIG. 13, the elements 64 are arranged in two relatively spaced groups $G^1$ and $G^2$. The elements 64 are in usual connected relation with each other, a conductor 65 being connected thereto at one end thereof, a conductor 66 being connected thereto at the other end thereof, and a conductor 67 establishing an intermediate connection therebetween.

The two groups $G^1$ and $G^2$, of elements 64, are fixedly united and secured in the position illustrated by FIG. 13, between two metallic plates 67 and 68 that are united by screws 70, the lower ends of which screws are threadedly engaged in correspondingly threaded apertures in the plate 68, as indicated in FIG. 14. A film, or coating, of insulating material is applied to the top and bottom surfaces of the elements 64, and/or to the inner surfaces of the metallic plates 67 and 68, so as to effect insulation of the two groups of elements $G^1$ and $G^2$ in the usual manner of the well known practice followed in the Frigistor construction, and insulating field.

Fixed to the top surface of the plate 67, by soldering or otherwise, so as to extend upwardly therefrom in substantially uniformly spaced relation throughout the entire surface area thereof, are metallic wire-like baffle elements 71.

Fixed to the bottom surface of the plate 68, by soldering or otherwise, so as to extend downwardly therefrom in substantially uniformly spaced relation throughout the entire surface area thereof, are metallic inverted U-shaped baffle elements 72 (see FIG. 11). A flat metallic plate 73 is fixedly secured by soldering or otherwise, to extend across the bottom edges of the baffle elements 72.

The top, bottom and sides of the Frigistor unit $F^1$ are encased in a suitable insulating material, such as rigid foam plastic insulating material indicated by the letter I in FIGS. 15, 22 and 23. Such insulating material may be of the "Dylite" type made and sold by the Sinclair-Koppers Company of Pittsburgh, Pa., and is provided in separate pieces of suitable size and shape so that, when applied, the Frigistor unit $F^1$ is encased by the insulating material in such manner as to provide internal upper and lower air flow ducts $D^1$ and $D^2$, each of which is open at the front and rear thereof and in which the baffle elements 71 and 72 are respectively located for action thereon by a fan generated air current flow, as hereinafter explained. The combined Frigistor unit $F^1$ and insulation I, can be readily combined to unitedly form a unit U of the desired shape and size for inclusion in the second and third embodiments of my invention, as shown in FIGS. 15 to 26 inclusive.

Referring now to the second shaver embodiment of my invention S–1, as illustrated by FIGS. 15 to 18 inclusive, it will be noted that the Norelco type shaver N of Patent No. 2,899,743 has applied to the top thereof the attachment A–1. The attachment A–1 generally comprises an elongated casing or housing 74, the underside of the forward portion 74a of which is shaped to fit like a cap over the top outer surface of the shaver N, and the rear portion of which contains the unit U as well as a small electric motor 75 that is secured to the rear portion of the casing 74 by screws 76. The motor 75 is arranged to operate a fan 77. The rear end of the casing 74 has removably and frictionally attached thereto a closure member 78 that is provided with air inlet slots 79.

The upper front portion 80 of the casing 74 is shaped to provide an arcuate air flow channel, the forward end of which terminates directly above the front end of the air inlet slots 42 of the shaver N.

Extending crosswise within the casing 74 and formed integrally therewith is an inclined partition 81 and adjacent to the ends of said partition the side walls of the casing 74 are provided with two air outlet apertures 82.

As indicated by small arrows in FIG. 15, the upper air flow channel $D^1$ of the unit U is arranged so that some of the air generated by the fan 77 will flow therethrough and then continue onwardly along the upper front portion 80 of the arcuate air flow channel into the air inlet slots 42 of the shaver N.

As also indicated by small arrows in FIG. 15, some of the air generated by the fan 77 will flow through the lower channel $D^2$ (see also FIG. 22) of the unit U and then out through the apertures 82 provided in the side walls of the casing 74.

As indicated in FIG. 15, the attachment A-1 is fixedly or permanently secured to the shaver casing 36 by suitable means, such as by three screws $36^a$ that extend through apertures provided therefor in the casing 74, and which screws $36^a$ have their free threaded ends anchored in correspondingly threaded apertures of the casing 36 of the shaver N.

By referring to FIG. 15, it will also be seen how the shaver S-1 is connected for operation with a source of electric energy, represented by conductors X and Y. The two conductors 65 and 66 of the Frigistor unit $F^1$ (see FIGS. 10 and 11) are connected with an electric current flow reversing switch 83, which latter in turn is connected by conductors 84 and 85 with the electric power lines X and Y.

The motor 75 is connected by two conductors 86 and 87 with two of the terminals of a double pole switch 88 and the two opposite terminals of said switch are connected by two conductors 89 and 90 with the electric power lines X and Y.

The two conductors 91 and 92 of the shaver cord 39 are connected with the conductors 86 and 87 and through the switch 88 with the power lines X and Y.

Operation

In operation, the shaver S-1 accomplishes the same results as the previously described shaver S. That is to say, the shaver S-1 can also be selectively operated to effect either cooling, or heating, of both the surface, or skin area acted on by the shaver, and of the rotary cutting elements 52 which are in contact with said area during the shaving operation.

This will be apparent by referring to FIG. 15 and assuming that, in this instance, the shaver S-1 is arranged to be battery operated. In such case, the power lines X and Y represent the positive and negative terminals of an electric dry cell battery of the proper voltage and amperage.

If it is desired that the shaver S-1 be operated to effect a cool shave, then the electric current flow reversing switch 83 is closed so that the electric current flow through the Frigistor unit $F^1$ is in such direction that the upper surfaces of the Frigistor elements 64 will become cold and in turn will cause the baffle elements 71 to become cold. The bottom surfaces of the Frigistor elements 64 will then become hot and thereby likewise cause the baffle elements 72 to become hot.

By next closing the switch 88, both the motor of the shaver N and the motor 75 will become operative. This will cause the fan 77 to generate an air current by drawing air into the attachment A-1 through the air inlet slots 79 and causing the air to flow through both of the air flow channels $D^1$ and $D^2$ of the unit U. The air flowing through the upper channel $D^1$ will be cooled by its impingment on and movement along the baffle elements 71.

After passing through the upper channel $D^1$ and being cooled, this cooled air current will flow into the slots 42 of the shaver N and downwardly through the same as previously explained and indicated by the small arrows in FIG. 15. Some of this cooled air will flow through the vertical apertures 63 of the shaver head and thereby dissipate the heat resulting from operation of the rotary cutting element 52 of the shaver head. The mass of precooled air will flow against the skin or area being shaved in the manner previously described.

The air flow generated by the fan 77 and flowing through the lower channel $D^2$ of the unit U, will impinge against and flow between the baffle elements 72, thereby absorbing the heat from the latter and transporting it out through the air outlet apertures 82. This heat dissipating or withdrawing action increases the efficiency of operation of the Frigistor $F^1$ in its cooling action of the air current that travels through, and out of the lower end of the shaver N.

The cooled air flow that travels downwardly along and through the shaver head and outwardly from the bottom end of the latter, in the manner previously described, will consequently subject the rotary shaving elements 52, the skin surface being shaved and the area adjacent thereto, to the cooling action of said precooled air.

When the shaver S-1 is to be operated to effect a warm shave, the electric current flow switch 83 is closed so that the electric current flow through the Frigistor unit $F^1$ is reversed, or in such direction that the upper surfaces of the Frigistor elements 64 will become hot and in turn will cause the baffle elements 71 to become hot. The bottom surfaces of the Frigistor elements 64 will then become cold and thereby likewise cause the baffle elements 72 to become cold. By then closing the switch 88, both the motor of the shaver N and the motor 75 will become operative and the shaving operation will be the same as before, except that the rotary shaving elements 52, the skin surface being shaved, and the area adjacent thereto, will be subjected to the warming action of said preheated air, in accordance with the air flow action previously described.

Embodiment No. 3

The third embodiment of my invention comprises the attachment A-2 disclosed by FIGS. 19 to 26 inclusive. This attachment is adapted to be removably applied to the shaver N and includes a device 95, a flexible rubber hose 96 and a unit 97.

As previously indicated, the Frigistor $F^1$ and certain other elements and parts included in the attachments A-1 and A-2, are structurally and functionally substantially alike. Such similar elements and parts are consequently identified in FIGS. 19 to 26 inclusive by the same reference characters as before to thereby avoid redundancy of descriptive material.

By referring to FIG. 25, it will be seen that the device 95, in shape, size and general configuration, is similar to the front cap-like portion $74^a$ of the attachment A-1. Accordingly, the device 95, like said cap-like portion, is also adapted to be mounted on the top surface of the shaver N in the same interfitting manner. However, the device 95 is adapted to be detachably connected with the shaver N and to this end is provided with an inverted U-shaped clamp member 98, that is formed of resilient material, such as stainless spring steel, or the like. The curved upper portion of the clamp member 98 is fixedly secured to the device 95 by rivets 99, and each of the legs of the clamp member is provided at the lower end thereof with a soft rubber or similar contact or holding element 100.

To detachably mount the device 95 on the shaver N, it is merely necessary to press it downwardly upon the top surface of the latter, until it rests in interfitting relation thereon, in the same manner as the front portion 74ᵃ of the attachment S–1 shown in FIG. 15. In doing so, the resilient clamp member 98 will first be spread when the rubber elements 100 pass along and over the upper bulkier portion of the shaver N, and will then contract so that the elements 100 will finally come to rest in the attachment holding position on the shaver N, as indicated by FIG. 26.

The rear end of the device 95 is centrally provided with an integral, short, cylindrical projection 101, to which the upper free end of the rubber hose 96 is frictionally connected in overlapping manner.

The lower free end of the rubber hose 96 is similarly connected with a short, integral, cylindrical projection 102 formed on the front end of the casing 103 of the unit 97.

The casing 103 of the unit 97 is of an elongated rectangular configuration and has a closure member 104 detachably connected to the rear end thereof by screws 105. The closure member 104 is provided with air inlet apertures 106.

Fixedly secured within the rear portion of the casing 103 by screws 107 (see FIG. 22) is a small motor 108 which operates a fan 109. Fixedly mounted within the forward portion of said casing 103 is the same type unit U as also forms part of the shaver attachment A–1 of my invention, except that the upper portion of the insulating material I thereof is extended forwardly and is shaped to continue the air duct D¹ to the cylindrical projection 102, formed on the front end of the casing of the unit 97, as clearly shown in FIG. 22.

The closure member 104 is provided with air inlet apertures 106, and air outlet apertures 109ᵃ are provided at each side of the casing 103.

Depending upon the selective operation of the attachment A–2, either precooled or preheated air will be fed from the unit 97 to the device 95, through the connecting hose 96.

In FIG. 23, only the two conductors 65 and 66 are shown which are connected with the Frigistor F¹ of the attachment A–2. The conductors 65 and 66 are connected with an electric current flow reversing switch 110. The switch 110 has its other two terminals connected by conductors 111 and 112 with the electric current supply lines X and Y.

A four pole switch 113 is arranged in interposed relation between the motor 108 and the electric current supply lines X and Y, as clearly indicated in FIG. 23.

A four pole switch 114 has been schematically indicated for connecting the shaver N to the current supply lines X and Y.

*Operation*

Since the attachment A–2 is structurally and functionally substantially like the attachment A–1, except that attachment A–2 is arranged to be separably connected with the shaver N, the operation of attachment A–2, when cooperatively combined with the shaver N, will be clear from the following brief description.

As a first step, the device 95 of the attachment A–2 is separably attached to the top of the shaver N, as previously described, so that the device 95 will be seated on the shaver N in the same relative position as the forward portion of the attachment A–1 is shown seated on the shaver N in FIG. 15.

Depending upon the desires of the user of the shaver, the combined shaver N and attachment A–2 can then be utilized and operated to effect either a cool shave, or a warm shave, by selectively actuating the electric current flow reversing switch 110, the motor switch 113 and the shaver switch 114, in substantially the same manner as when operating the shaver S–1 of my invention.

In this connection, it is to be noted that, in the wiring diagram of FIG. 15, the two wires 91 and 92 of the shaver cord are shown connected with the electric current supply lines X and Y, through the switch 88, which also connects the motor 75 with the latter. In other words, in this arrangement, closing of the switch 88 will cause simultaneous operation of the shaver N and the motor 75 of the attachment S–1. In the diagram of FIG. 23 two separate switches 113 and 114 are shown for separately controlling operation of the motor 108 and the shaver N. Accordingly, either of these two arrangements can be utilized in order to provide the best results in any particular instance.

*Modifications*

Of course, my novel improvements can be changed and modified in various ways without departing from the invention herein disclosed, the scope of which is more particularly indicated and defined by the hereto appended claims.

For example, if desired, a thermostatic control unit can be cooperatively combined with my improvements in accordance with the well known practice, so that an electric shaver provided with the novel precooling and preheating means of my invention, would automatically set itself to either provide a cool shave, or a warm shave, for greatest shaping comfort in accordance with the temperature condition prevailing at the place of location where the shaver is used.

Likewise, other structural and functional changes, or additions, can be made that will be obvious to those skilled in this art from the disclosure herein made of my invention.

In this connection, it is also to be understood that the elements and parts indicated in the wiring diagrams of FIGS. 6, 15 and 23 are of a standard, or conventional, type, and are combined for operating, as described, in accordance with the usual and well known practice followed in the electrical engineering field. Furthermore, when any of the electrical shavers of my invention are provided for connection to a power line, such as an electrical house current, and this requires a change in the operating voltage of any of the electrical parts indicated in the said wiring diagrams, a proper type transformer, or other electrical element or unit can be added as required, all in accordance with the standard practice followed in the electrical shaver art, or the general electrical engineering field.

I claim:

1. A power operated shaver comprising: a shaving head adapted to be brought into contacting relation with the surface area acted on by the shaver and provided with cooperatively arranged cutting elements; means for establishing a first air flow against both said cutting elements and said surface area; an electrical unit having opposed areas one of which is arranged in the path of travel of said first air flow and selectively operable in such manner as to effect the heating and cooling respectively of said first air flow when the unit is electrically energized; means for establishing a second air flow that is discharged from the shaver at a location remote from said shaving head; baffle elements connected with and extending from one of said areas of the unit into the path of travel of one of said air flows; and a selectively operable electric current flow reversing switch connected with said unit for selectively energizing said unit and thereby effect the heating and cooling respectively of said first air flow.

2. A power operated shaver in accordance with claim 1, wherein the baffle elements are connected with and extend from both of said areas of the unit in such manner that the baffle elements from one of said unit areas extend into the path of travel of the first air flow and the baffle elements from the other of said unit areas extend into the path of travel of said second air flow.

3. A power operated shaver in accordance with claim 1, including means establishing a connection between one of said unit areas and a certain portion of the shaver head which means will tend to equalize the temperature of said one unit area and said shaver head portion.

4. A power operated shaver comprising: a housing; a shaving head externally exposed along said housing for contacting relation with the area acted on by the shaver; a unit including electrically energized means for selectively establishing a heated air flow and a cooled air flow respectively; and air flow passage means arranged within said housing in such manner as to direct said heated and cooled air flows to said shaving head.

5. A heating and cooling attachment for a power operated shaver having a housing provided with an air inlet aperture, which device comprises; a cap-like member that is shaped for mounting against the housing in air inlet closing manner; connecting means adapted to removably maintain said attachment against said housing; an electrically energized unit adapted to selectively generate a heated air flow and a cooled air flow; and a flexible conduit arranged to connect said cap-like member and unit.

6. A power operated shaver comprising: a housing; a shaving head externally exposed along said housing for contacting relation with the area acted on by the shaver; a unit for selectively establishing a heated air flow and a cooled air flow respectively; means for selectively operating said unit; and air flow passage means arranged within said housing in such manner as to direct said heated and cooled air flows to said shaving head.

7. A power operated shaver comprising: a shaving head adapted to be brought into contacting relation with the surface area acted on by the shaver and provided with cooperatively arranged cutting elements; means for establishing an air flow against both said cutting elements and said surface area; an activatable cooling unit arranged in the path of travel of said air flow in such manner that it will effect cooling of said air flow when the unit is activated; and means for determinedly activating said unit.

8. A power operated shaver comprising: a shaving head adapted to be brought into contacting relation with the surface area acted on by the shaver and provided with cooperatively arranged cutting elements; means for establishing an air flow against both said cutting elements and said surface area; an activatable heating unit arranged in the path of travel of said air flow in such manner that it will effect heating of said air flow when the unit is activated; and means for determinedly activating said unit.

References Cited
UNITED STATES PATENTS

| | | | |
|---|---|---|---|
| 2,899,743 | 8/1959 | Heuvel | 30—34 |
| 3,057,061 | 10/1962 | Blachly | 30—34 |
| 3,141,239 | 7/1964 | Meyer et al. | 30—34 |

MYRON C. KRUSE, *Primary Examiner.*